US009864391B2

(12) United States Patent
Lu et al.

(10) Patent No.: US 9,864,391 B2
(45) Date of Patent: Jan. 9, 2018

(54) TABLET BASED DISTRIBUTED INTELLIGENT LOAD MANAGEMENT

(71) Applicant: Siemens Corporation, Orlando, FL (US)

(72) Inventors: Yan Lu, West Windsor, NJ (US); Siyuan Zhou, San Diego, CA (US)

(73) Assignee: Siemens Corporation, Iselin, NJ (US)

(*) Notice: Subject to any disclaimer, the term of this patent is extended or adjusted under 35 U.S.C. 154(b) by 312 days.

(21) Appl. No.: 14/423,718

(22) PCT Filed: Aug. 23, 2013

(86) PCT No.: PCT/US2013/056407
§ 371 (c)(1),
(2) Date: Feb. 25, 2015

(87) PCT Pub. No.: WO2014/039291
PCT Pub. Date: Mar. 13, 2014

(65) Prior Publication Data

US 2015/0241895 A1 Aug. 27, 2015

Related U.S. Application Data

(60) Provisional application No. 61/696,949, filed on Sep. 5, 2012.

(51) Int. Cl.
*G05F 1/66* (2006.01)
*G05B 15/02* (2006.01)
(Continued)

(52) U.S. Cl.
CPC ............... *G05F 1/66* (2013.01); *G05B 15/02* (2013.01); *H02J 3/14* (2013.01); *H02J 13/0079* (2013.01); *H04L 67/10* (2013.01); *H04L 67/125* (2013.01); *G05B 2219/2642* (2013.01); *Y02B 70/3225* (2013.01); *Y02B 70/3241* (2013.01); *Y04S 20/222* (2013.01); *Y04S 20/227* (2013.01)

(58) Field of Classification Search
CPC ......... G05F 1/66; H04L 67/10; H04L 67/125; G05B 15/02; H02J 3/14
See application file for complete search history.

(56) References Cited

U.S. PATENT DOCUMENTS

2009/0187499 A1* 7/2009 Mulder .................. G05B 15/02 705/30
2010/0016683 A1* 1/2010 Lemmers ............ G06F 19/3418 600/301

(Continued)

*Primary Examiner* — Ryan Jarrett

(57) ABSTRACT

A facility is connected to an electricity utility and is responsive to Demand Response Events. A plurality of devices is each individually connected to the electricity grid via an addressable switch connected to a secure network that is enabled to be individually switched off by a server. An occupant of a room in control of the plurality of devices provides via a Human Machine Interface on a tablet a preferred order of switching off the plurality of devices in case of a Demand Response Event. A configuration file based at least partially on the preferred order and on a severity of the Demand Response Events determines which devices which of the plurality devices will be switched off. The server accesses the configuration file and switches off the devices included in the configuration file.

20 Claims, 11 Drawing Sheets

(51) Int. Cl.
*H02J 3/14* (2006.01)
*H02J 13/00* (2006.01)
*H04L 29/08* (2006.01)

(56) References Cited

U.S. PATENT DOCUMENTS

| | | | | |
|---|---|---|---|---|
| 2011/0063126 | A1 | 3/2011 | Frader-Thompson | |
| 2012/0023977 | A1 | 2/2012 | Kang | |
| 2012/0053737 | A1 | 3/2012 | Besore | |
| 2012/0095601 | A1* | 4/2012 | Abraham | E06B 9/68<br>700/278 |
| 2012/0158196 | A1 | 6/2012 | Duff | |

* cited by examiner

400

| Group Preference | Individual Preference |
| --- | --- |
| **Room kk** | |
| Group 1<br>301- Lamp<br>302- Radio<br>125 W | 301 Lamp 60 W<br>302 Radio 65 W |
| Group 2<br>305 - Printer<br>306 - Phone Charger<br>200 W | 305 Printer 150 W<br>306 Charger 50 W |
| Group 3<br>307 - Computer<br>308 – 2nd Monitor<br>1000 W | 308 2nd Monitor 100W<br>307 Computer 900W |

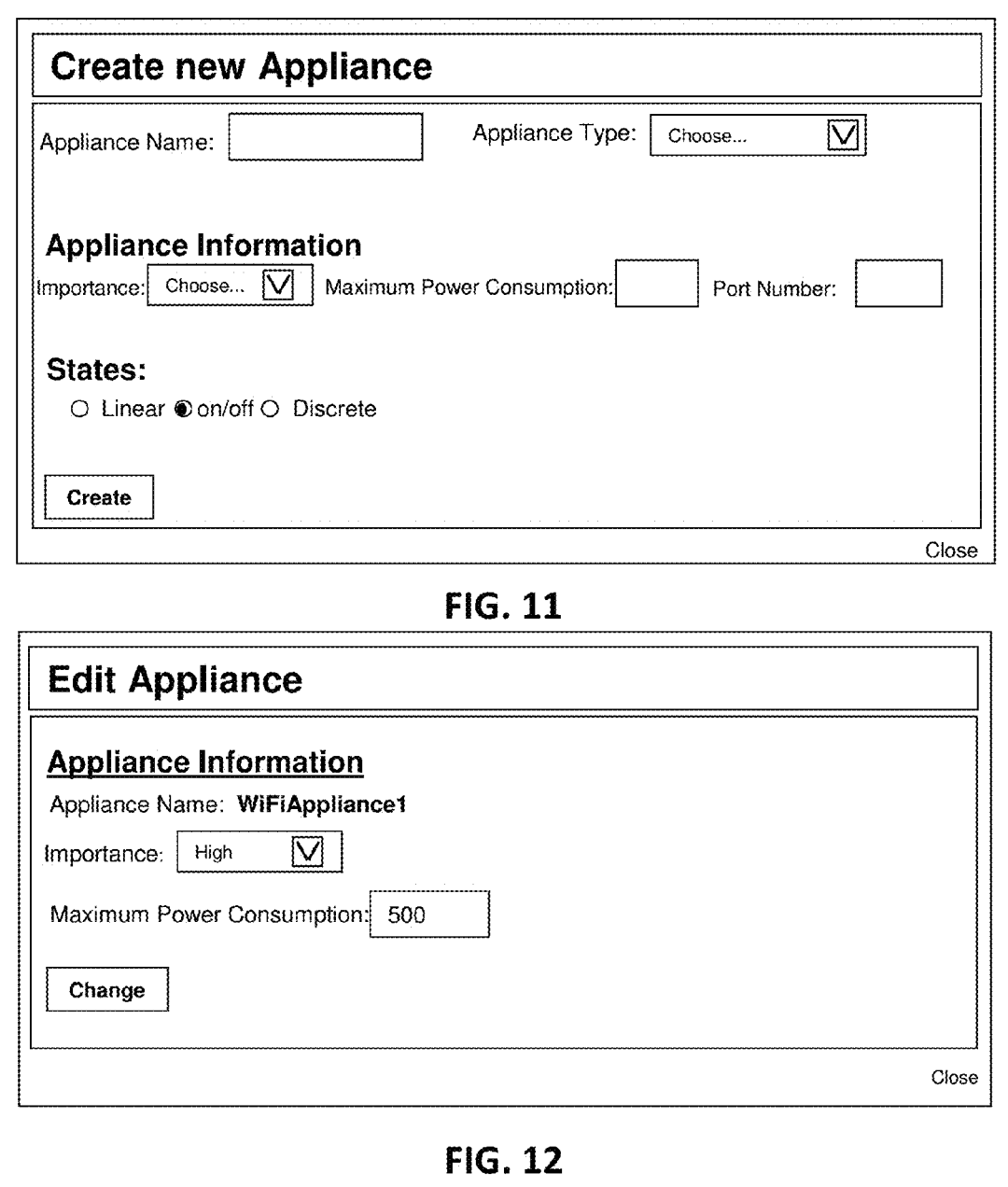

Create new Appliance

Appliance Name: Appliance Type: Choose...

Appliance Information

Importance: Choose... Maximum Power Consumption: Port Number:

States:

Linear on/off Discrete

Create

Close

FIG. 11

Edit Appliance

Appliance Information

Appliance Name: WiFiAppliance1

Importance: High

Maximum Power Consumption: 500

Change

Close

FIG. 12

TABLET BASED DISTRIBUTED INTELLIGENT LOAD MANAGEMENT

CROSS REFERENCE TO RELATED APPLICATIONS

The present application claims priority to and the benefit of U.S. Provisional Patent Application Ser. No. 61/696,949 filed on Sep. 5, 2012.

GOVERNMENT RIGHTS

This invention was made with government support under Contract No DE-EE0003847 awarded by the Department of Energy. The government may have certain rights in his invention.

TECHNICAL FIELD

The present invention is related to systems and methods for Demand Response management in an electricity grid. More in particular it relates to methods and systems to configure and monitor distributed loads through a communication network.

BACKGROUND

Demand side management in electricity grids such as a Smart Grid is becoming a key component of future smart grid that can help reduce peak load and adapt elastic demand to fluctuating generations. In the February 2006 report to the Congress, the Department of Energy (DOE) defined DR as "changes in the electric usage by end-use customers from their normal consumption patterns in response to change in the price of electricity over time, or to incentive payments designed to induce lower electricity use at times of high wholesale market prices or when system reliability is jeopardized" as described in "[1] Assessment of Demand Response and Advanced Metering, FERC report, September, 2007."

In 2009, Federal Energy Regulatory Commission (FERC) reported that the peak demand without any demand response is estimated to grow at an annual average growth rate of 1.7%, reaching 810 GW in 2009 and approximately 950 GW by 2019. This report also projected that existing DR programs could offset 4% of U.S. peak demand by year of 2019. Furthermore, if these programs were expanded to cover the entire country and a small number of price-responsive programs were added to mix, the impact would rise to 9% as described in "[2] A National Assessment of Demand Response Potential, FERC report, prepared by The Brattle Group, Freeman, Sullivan & Co and Global Energy Partners, LLC, June, 2009."

It is advantageous to enable users to configure and monitor distributed loads through a Human Machine Interface (HMI). For security reasons it is desirable to separate the control logic for selectively shedding distributed loads in an electricity network in response to a Demand Response event and the Human Machine Interface (HMI) of distributed controllers. Systems and methods that provide a desirable Human Machine Interface (HMI) of distributed controllers and that are adequately and securely separated from the control logic are believed to currently not exist.

Accordingly, improved and novel methods and systems for Human Machine Interface (HMI) of distributed controllers in an electricity grid are required.

SUMMARY

In accordance with an aspect of the present invention, a system is provided to manage a group of devices in each room in a plurality of rooms in a facility connected to an electricity grid under a Demand Response (DR) Event, comprising a first server connected by a network to the plurality of rooms, each of the plurality of rooms having a plurality of switches, each switch enabled to selectively switch on or off a device in the group of devices from the electricity grid, the first server hosting a plurality of software agents, wherein each software agent is enabled to selectively control on/off switching of a plurality of switches in one of the plurality of rooms in accordance with an order of switching off of the plurality of switches in the one of the plurality of rooms based on a level of severity of the DR Event, a computing device connected via the network to the first server to cover the one of the plurality of rooms and enabled to display a Human-Machine Interface (HMI) exclusive to the one of the plurality of rooms, the HMI being generated by a first software agent in the plurality of software agents which is dedicated to the one of the plurality of rooms and the HMI being enabled to provide a preferred order of switching off of the plurality of switches in the one of the plurality of rooms during the DR event and a second server connected to the first server by a secure network enabled to determine the level of severity of the DR Event and to instruct the first software agent to switch off at least one switch in accordance with the order of switching off of the plurality of switches.

In accordance with a further aspect of the present invention, a system is provided, wherein the order of switching off switches is the preferred order.

In accordance with yet a further aspect of the present invention, a system is provided, wherein the preferred order of switching off switches is enabled to be modified through a device that is authorized to be used by a facility manager.

In accordance with yet a further aspect of the present invention, a system is provided, wherein the second server is enabled to access a configuration file to provide instructions to the first software agent for the order of switching off switches.

In accordance with yet a further aspect of the present invention, a system is provided, wherein the configuration file is enabled to be modified through a computing device on the secure network.

In accordance with yet a further aspect of the present invention, a system is provided, wherein the HMI is not enabled to access the second server.

In accordance with yet a further aspect of the present invention, a system is provided, wherein the computing device is a tablet.

In accordance with yet a further aspect of the present invention, a system is provided, wherein the tablet is connected to the network through a wired connection.

In accordance with yet a further aspect of the present invention, a system is provided, wherein a switch in the single room that connects to a non-operational device is switched off during the DR Event.

In accordance with yet a further aspect of the present invention, a system is provided, further comprising: the HMI transmitting a request to the first server to switch on the switch in the single room to allow the non-operational device to become operational.

In accordance with yet a further aspect of the present invention, a system is provided, wherein the order of switching off switches is determined by a Demand Response contract with an occupant of the single room.

In accordance with another aspect of the present invention, a method is provided for managing a group of devices in each room in a plurality of rooms in a facility connected to an electricity grid under a Demand Response (DR) Event, comprising: connecting the plurality of rooms by a network to a first server, each of the plurality of rooms having a plurality of switches, each switch enabled to selectively switch on or off a device in the group of devices from the electricity grid, the first server hosting a plurality of software agents, wherein each software agent is enabled to selectively control on/off switching of a plurality of switches in one of the plurality of rooms in accordance with an order of switching off of the plurality of switches in the one of the plurality of rooms based on a level of severity of the DR Event, connecting a computer covering the one of the plurality of rooms via the network to the first server, the computer being enabled to display a Human-Machine Interface (HMI) exclusive to the one of the plurality of rooms, the HMI being generated by a first software agent in the plurality of software agents, the first software agent being dedicated to the one of the plurality of rooms and the HMI being enabled to provide a preferred order of switching off of the plurality of switches in the one of the plurality of rooms during the DR event and connecting a second server to the first server by a secure network enabled, the second server enabled to determine the level of severity of the DR Event and to instruct the first software agent to switch off at least one switch in accordance with the order of switching off of the plurality of switches.

In accordance with yet another aspect of the present invention, a method is provided, wherein the order of switching off switches is the preferred order.

In accordance with yet another aspect of the present invention, a method is provided, wherein the preferred order of switching off switches is enabled to be modified through a device that is authorized to be used by a facility manager.

In accordance with yet another aspect of the present invention, a method is provided, wherein the second server is enabled to access a configuration file to provide instructions to the first software agent for the order of switching off switches.

In accordance with yet another aspect of the present invention, a method is provided, wherein the configuration file is enabled to be modified through a computing device connected to the secure network.

In accordance with yet another aspect of the present invention, a method is provided, wherein the HMI is not enabled to access the second server.

In accordance with yet another aspect of the present invention, a method is provided, wherein the HMI computer is a tablet.

In accordance with yet another aspect of the present invention, a method is provided, wherein the tablet is connected to the network through a wired connection.

In accordance with yet another aspect of the present invention, a method is provided, wherein a switch in the one of the plurality of rooms that connects to a non-operational device is switched off during the DR Event.

DRAWINGS

FIGS. 10, 11 and 12 illustrate web user interfaces in accordance with various aspects of the present invention.

DESCRIPTION

Figure 1:
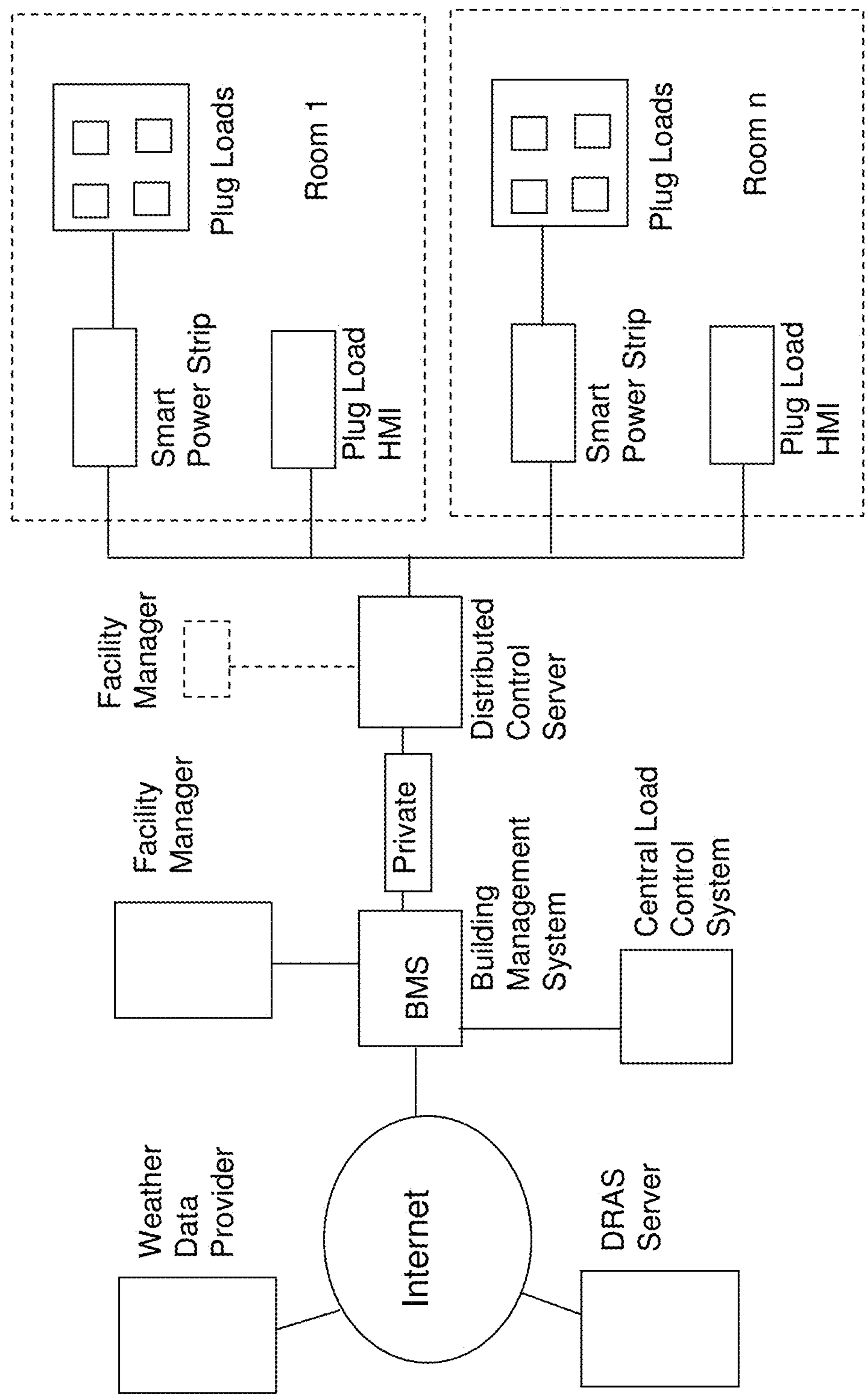
FIG. 1 illustrates in diagram a network with plug loads in accordance with one or more aspects of the present invention.

Due to the nature of fluctuating electrical usage, Demand Response (DR) with only centralized control is difficult to maintain the load reduction goal consecutively.

In accordance with various aspects of the present invention, a distributed intelligent load management system is provided that controls distributed plug-in loads from one secured centralized server and uses portable and mobile networked computer devices such as tablets as Human Machine Interface (HMI) for the users to configure and monitor distributed loads through a network in their own workspace or room. In one embodiment of the present invention the network is a wired network. In one embodiment of the present invention the network is a wired Ethernet network. In one embodiment of the present invention the network is a wireless network. In one embodiment of the present invention the network is a partially wireless network. In one embodiment of the present invention the network is a secure Virtual Private Network. (VPN).

As Demand Response (DR) has been recognized as an essential component of the smart grid, frequency response, regulation and contingency reserve functions performed traditionally by generators are now starting to involve demand side resources. The benefits from demand response include peak reduction and load shifting, which will defer new infrastructure investment and improve generator operation efficiency as described in "[3] S. Lu et al., Centralized and decentralized control for demand response Innovative Smart Grid Technologies (ISGT), 2011 IEEE PES, January 2011." J. Wang et al. in "[4] J., Wang, M. Biviji, and W. M. Wang, Case studies of smart grid demand response programs in North America, Innovative Smart Grid Technologies (ISGT), 2011 IEEE PES, 2011, pp.: 1-5" presented and analyzed case studies of different electric utility programs, including enabling technologies and incentives, on smart grid demand response, and addressed some issues and suggestions about DR implementation.

DR is becoming an integral part of the power system and market operational practice as described in "[5] National Institute of Standards and Technology, NIST Framework and Roadmap for Smart Grid Interoperability Standards, Release 1.0, Special Publ. 1108, January 2010, pp. 145-146", not only is the volume of DR quickly growing, but these resources are treated as dispatchable capacity resources and are being called on much more frequently and in larger amounts than in previous DR programs.

Part of a Demand Response program of a utility is the declaration of a Demand Response (DR) Event. A DR Event is an authorized request by a utility to effect curtailment of usage of power provided by the utility in a participating facility for a period of time.

Several DR programs require participants to reduce certain amount of load consecutively over a certain period of time, such as the Distribution Load Relief Program from Consolidated Edison Company of New York as described in "[6] <http://www.coned.com/documents/elec/158q-158r8.pdf>" requires that the amount of Load Relief by a customer must be at least 50 KW of Load Reduction for at least five consecutive hours during the Load Relief Period to get payment. To achieve such requirement, control over central systems like Heating Ventilation and Air Conditioning (HVAC) system was discussed in "[7] X. Chen, J. Jang, and D. Auslander and et al., Demand Response-Enabled Residential Thermostat Controls, 2008 ACEEE Summer Study on Energy Efficiency in Buildings, 2008" and "[8] S. Kiliccote, M. A. Piette and D. S. Watson, Dynamic Controls for Energy Efficiency and Demand Response: Framework Concepts and a New Construction Study Case in New York, Proceedings of the 2006 ACEEE Summer Study on Energy Efficiency in Buildings, Pacific Grove, Calif., August, 2006." These references investigate the use of DR controls strategies in commercial buildings and provided specific details on DR control strategy design concepts for a new building in New York.

The major limitation of the prior DR controls is that the distributed plug-in loads are not participating so that the fast variation of the electrical usage can possibly be above the demand response load limit in real time. Typical Demand Response event lasts for a period of time (e.g. 2 hours), and the utility usually requires the participants to remain the low power consumption (e.g. 15% lower than peak load) during this time. The utility usually queries the power consumption from participants multiple times (e.g. every 15 mins) during the DR event to verify if the low power consumption is maintained. This requirement contradicts with the fast variation nature of the electrical usage, e.g. the temperature is higher than expected so HVAC is consuming more, or a meeting room is occupied temporarily so the lights are on. Therefore, the participant building needs one way to compensate such variation. However, centralized systems are usually not good candidates for such real-time variation—e.g. increase one degree of set temperature in HVAC system in summer doesn't necessarily reduce power consumption, and the central lighting affects too many people to be turned off. Instead, the plug loads are the good candidates because they can contribute immediately to the power reduction.

W. Zhang in "[9] W. Zhang, S. Zhou and Y. Lu, Distributed Intelligent Load Management and Control System, 2012 IEEE Power & Energy Society General Meeting, San Diego, Calif., July, 2012" proposed a two level distributed intelligent plug-in loads management system, where plug-in loads are controlled by distributed controllers termed as Gateways to compensate the gap between DR target and real-time power usage.

However, the problem of choosing proper system architecture for the distributed controllers is not addressed. Using a desktop or laptop as distributed controller in the same room with the plug-in loads could be an easy option. However, due to the fact that the control logic in a Gateway has to run all the time, it is not efficient to keep the desktops or laptops on all the time. In addition, in buildings that have high security requirements, the building management system (BMS) needs to be isolated from the user network, where the connection between the BMS to distributed controllers has to be in a private, secure network. Therefore, choosing the appropriate system structure for distributed controllers is one aspect that is an aspect of the present invention to integrate the distributed plugin loads control into a building management system.

Since Apple® released the iPad® in 2010, which became the first mobile computer tablet to achieve worldwide commercial success, the popularity of tablets continues to rise. According to a study from NYDailyNews as described in "[10] NYDailyNews.com <http://www.nydailynews.com/news/money/tablets-popularity-roof-onethird-u-s-intemet-users-survey-article-1.1097990>", adaptation of the tablet is now at 31% of the U.S. population that uses the Internet, equaling 74 million users and by next year, the penetration expected to reach 47%, or 117 million users. Since 2010, numerous tablets with Google's Linux-based Android™ operating system have been announced and are more and more affordable. Due to the open nature of Android system, it is ideal to be customized with special usage, such as the HMI of the distributed controllers.

One advantage of aspects of the present invention is the ability to separate the control logic and HMI of the distributed controllers, where control logic of all distributed controllers are executing in a centralized server and tablets are customized as HMI platform for them. For systems that require high security, tablets can be extended to use to Ethernet instead of wireless connection.

Structural and Functional Aspects

In accordance with an aspect of the present invention a system architecture is provided that is illustrated in FIG. 1. The Building Management System (BMS) is capable of receiving demand response (DR) signal and Weather Data from the Internet, and controlling central load systems such as HVAC systems through Central Load Control System. The facility managers of the building are the only personnel that have access to the BMS. The control logic of all distributed controllers can run on one Distributed Control Server, which is connected to the BMS through a private secure network (PVN), as well as Smart Power Strips such as Ethernet Power Strips or any other addressable power plug that can be switched on or off by a controller and HMIs in all rooms.

A Smart Power Strip is a device with one or more electricity power outlets which are individually or collectively controlled via a network such as Ethernet. One example of this is the Web Power Switch 7 marketed by Data Loggers, Inc. of Santa Clara, Calif. Herein, power outlets can be selectively and remotely be switched on or off from a control device such as a server.

In accordance with an aspect of the present invention a Smart Power Strip is provided that is connectable to the electricity grid. The Smart Power Strip contains at least one power outlet to power an electricity device and the at least one outlet on the Smart Power Strip is enabled to be selectively switched on or switched off by a control signal. The control signal is initiated or provided via a communication network. The communication network in one embodiment of the present invention includes the Distributed Control Server.

Accordingly, during a DR event an outlet on a Smart Power Strip can be selectively de-energized thus disconnecting or switching off the device that is energized through that outlet. At the same time other outlets on the Smart Power Strip may still be energized and thus the active devices on those other outlets remain switched on or connected. The communication network remains active during an DR Event. Furthermore, control components that determine the switching state of a relays also remain energized, allowing outlets on the Smart Power Strip to be selectively energized to connect devices to the electricity grid.

In one embodiment of the present invention all outlets on a Smart Power Strip are de-energized or disconnected from the electricity grid, while maintaining the network in an active state.

In one embodiment of the present invention one or more electricity outlets in a room are provided with a network controlled relay that can be selectively switched on or switched off. In a preferred embodiment of the present invention the communication network remains active during a DR Event and relays remain energized to be switched on or off during the DR Event.

Figure 2:
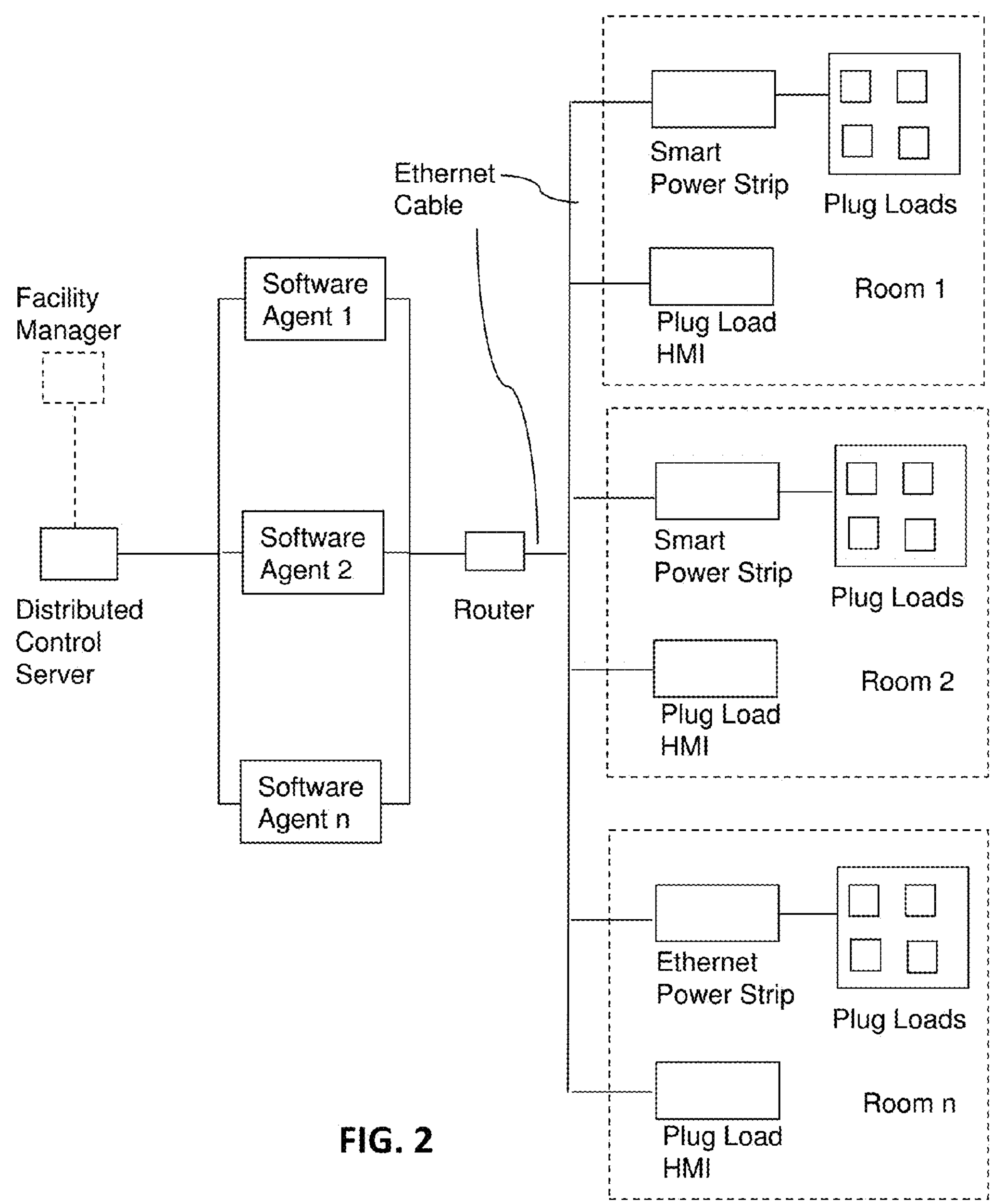
FIG. 2 illustrates a network with software agents in accordance with one or more aspects of the present invention.

The Distributed Control Server is programmed with Software Agents, wherein each agent is assigned to one room and it controls plug loads in the room, as illustrated in FIG. 2 where the Software Agents control their designated room and executing as independent entities, and negotiate with BMS representing their own plug loads. Plug loads are plugged into the related Smart Power Strip in the room so that they can be controlled by their agent on Distributed Control Server through the network connection, which may be an Ethernet connection.

It is noted that there are different ways to connect a tablet to a wired Internet cable. In case of the iPad one may connect a wireless router to the Internet cable, this enabling a connection with the iPad. Other tablet devices may have an Ethernet plug or receptacle or can be connected to the Ethernet cable by using a USB-to-Ethernet adapter if the tablet has a USB port.

The web-based graphic user interface enables the tablets as HMIs of the agents which grant accessibility to the users to configure and monitor the status of plug loads from every room. The User interface can be purely a web page, in which case the server generates and servers the page and the tablet only displays. The User Interface can also be a mobile application, where the client side is installed and it will cooperate with the server to display information All Smart Power Strips and tablets are connected to the Distributed Control Server by one or several Ethernet Routers so that each of them is assigned a unique IP address. The Software Agents are configured with different port numbers so that they can be connected through the same IP address to different tablets separately. Authentication is also enabled on each tablet to enforce that only the plug loads in the same room will be configured or monitored. In one embodiment of the present invention and each room or identifiable area is served by its own Software Agent. For instance as illustrated in FIG. 1, Software Agent 1 is dedicated to room 1 and Software Agent n is dedicated to room n.

In accordance with an aspect of the present invention a separated architecture of Plug-in load Control logic in Software Agents and HMI provides security to building management system is provided. Because there is no direct connection from a HMI device to the building management system and an end user can only access the interfaces provided by Software Agents on a HMI.

In accordance with an aspect of the present invention Software Agents have a centralized placement on one server, where each Agent controls distributed plug loads in one room. This provides the system administrator with full control on plug load control strategies because any change to the strategy can be implemented on the same physical machine to all agents without notifying end users. In addition, comparing to having control strategies on the same device as HMI, the proposed system architecture also provides higher protection on the plug load control strategies with centralized management, because the end users can only change configurations from HMI, and are not possible to access any further control logic on the server.

In accordance with an aspect of the present invention mobile computing devices with wireless and wired network communication capabilities such as tablets are provided to display an HMI for distributed controllers and can be customized with Ethernet connection based on security requirements.

In one embodiment of the present invention the Control logic is the algorithm running inside the Distributed Control Server and the configuration file provides certain parameters to the control logic. For instance, the Distributed Control Server has the control logic related to Demand Response Events of different severities. The BMS may provide instructions to the Distributed Control Server that selectively provide parameter values that select specific control logic configurations, for instance based on a severity of a Demand Response (DR) Event, or the time of the DR Event, or the time of year of the DR Event.

For instance a DR Event during the day may require a different response than during the night. For instance, during the day and in order to protect productivity, shutting down computers should be avoided. Many people leave their computers on during the night when they are not in the office. Accordingly, disconnecting computers during the night in a DR Event, with some exceptions, should not affect productivity and could thus be an easy way to shed loads.

Many people leave their desktop computer, including its monitor, switched on permanently. A computer which is not signed on to a network during the day, may be assumed to be in an unoccupied office space and is in one embodiment of the present invention a low priority device to be switched off or disconnected in an early stage of a DR Event.

During the winter, some people have stand-by electric heaters in their offices, which will not be in use during the summer. Also during early morning and late afternoon additional lights may be switched on in the winter. This indicates the need for making a distinction between seasons in reacting to DR Events.

Other parameters may depend on policy matters or agreements between occupants and the facility management. In one embodiment of the present invention these parameters are stored on the BMS and activated to the Distributed Control Server by the BMS.

Some of the parameters, like the appliance priority can be changed in the configuration file on the BMS as well as from the user HMI as well as on the Distributed Control Server, for instance by the Facility Manager.

The Facility Manager has access to both the BMS and to the Distributed Control Server and the configuration file and is authorized and enabled to access, modify, add or delete certain configurations, including adding a configuration file, editing a configuration file or deleting a configuration file. The term Facility manager is used herein to indicate any person authorized to modify a file or setting on the BMS. The Facility Manager also has access to the Distributed Control Server (DCS). The Facility Manager may in one embodiment of the present invention access the BMS and DCS from the same computing device. For security reasons it is desirable to have the network connected to the plug-load switches separated and the private network of the BMS strictly separated. In that case the Facility Manager has at least one secure terminal such as a computing device connected to the BMS and a separate terminal such as a tablet or any other computing device connected to the DCS. Users via their HMI are also connected to the DCS. The Facility Manager has a higher level of control on the DCS than the user HMIs.

The Facility Manager also is authorized and enabled to issue direct commands that disconnects or connects a device from or to the electricity grid. For instance during a DR event it is required to make a copy of a document while the copier has been disconnected from the grid. The Facility Manager is enabled and authorized to access a server and to directly reconnect the copier, either permanently or for a predetermined period. Additionally, the Facility Manager is authorized to disconnect certain devices within the facility, for instance for a period during the DR event wherein the copier is reconnected. In one embodiment of the present invention the Facility Manager is authorized and enabled to perform any change during a DR event, wherein the Facility Manager has to stay within the constraints of the DR event. In one embodiment of the present invention, the Facility Manager is enabled and authorized to override restrictions imposed by a DR event.

In one embodiment of the present invention, a Facility Manager can edit configurations on the DCS submitted by an HMI, preset values such as priority of switches related to a room on the DCS, exclude an HMI from changing certain values and the like. In general an HMI related to a room does not have those privileges.

In one embodiment of the present invention, the system is a self policing system. In that case the DCS accepts switch-off priorities as provided via the HMIs. Each plug-load has its own profile, including a rated power consumption. A user for instance may be allowed to provide one plug-load with a "last-to-switch-off" priority, which in general will be a computer.

The switching-off priorities are uploaded from the HMIs to the DCS. In case of a DR Event the DCS is instructed to shed a certain amount of power consumption and will switch off the switches for instance per category until the power reduction is achieved. In a further embodiment of the present invention at least the BMS and preferably the DCS, for instance via the BMS has access to the actual metered power consumption. If shedding a first priority class of switches does not achieve the savings goal a next class of priority will be disconnected. This is clearly the simplest strategy without requiring much intervention. However, it may turn out to be a too excessive approach that affects productivity unnecessarily.

Accordingly, modifying settings on the DCS based on a preference or optimization scheme is a preferable approach. Furthermore, an even more optimized approach applying guidance from the BMS to the DCS via for instance configuration settings based on external conditions, including severity of a DR Event and time of day or year, temperature and other conditions may help to selectively achieve power saving without unnecessarily hurting productivity.

The BMS has a higher level of control than the DCS. When a DR event is announced or is initiated, the BMS in one embodiment of the present invention will start the negotiation with the software agents in the DCS. Each Agent is aware of the total connected power in a room and power that can be shed based on a certain priority. For instance, a BMS requires 5 kW in power reduction per floor of a building. Each Software Agent in one embodiment of the present invention knows how much power is currently consumed and which switches and their connected devices are active. The Software Agents each receive a reduction goal and the control logic inside each agent decides which appliance to turn off based on priority (from user HMI and configuration file). A facility manager can change the configuration file of agents in the DCS to override the priority and/or to influence the control. For security reason, the tablets should only be dedicated to a network connecting the plug load switches. Also, by using the Distributed Control Server (DCS), even if the network between the tablet and the Distributed Server is compromised, the network between Distributed Server and BMS is NOT, because they are separated (E.g., different network interfaces are used on the DCS for those networks).

In accordance with an aspect of the present invention the BMS provides a direct command to the DCS or to one or more software agents to disconnect certain devices, for instance individual end user devices, a group of end-user devices or one or more Smart Power Strips from the electricity grid. Such a command overrides an existing configuration file that is in operation. Such an override may be a "special configuration file" that goes into effect under certain conditions or that is manually invoked, for instance by a facility manager. Such an override may also be a specific command entered by for instance a facility manager. For instance one or more Smart Power Strips may fail to respond to disconnecting signals. The facility manager may manually disconnect devices to make up for a failure to disconnect devices that are marked to be disconnected from power in an active configuration file but fail to respond.

The one or more Smart Power Strips may be on a power group in a facility that can be selectively switched off or powered down from the facility power infrastructure. When required, a facility manager may override the selective disconnecting from power of individual devices and disconnect an entire power group.

Figures 3, 4:
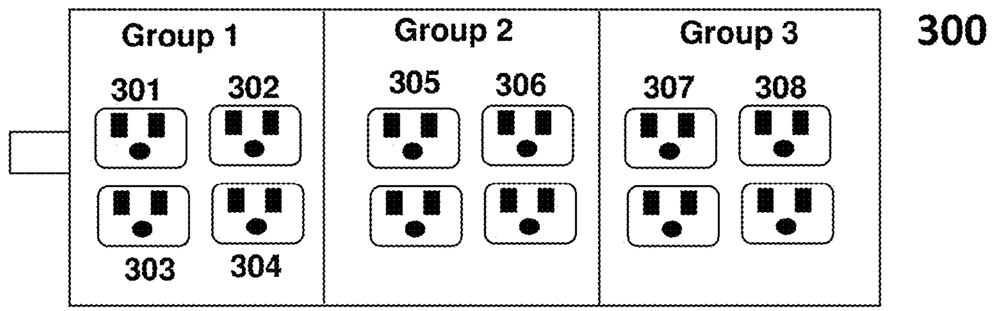
FIG. 3 illustrates a plurality of addressable power outlets that are enabled to be individually disconnected from a power grid in accordance with various aspects of the present invention.
FIGS. 4 and 5 illustrate human-machine interfaces in accordance with various aspects of the present invention.

FIG. 3 provides an illustrative example of a Smart Power Strip. However, individually controlled power outlets, controlled via a network or provided with a on/off switch with a network address are also contemplated. In FIG. 3 a power strip 300 has 12 individually controllable power outlets. A main powerline comes in at the left side to provide power to the outlets. The powerstrip is divided into 3 groups, Group 1, Group 2 and Group 3 of outlets, with Group 1 including outlets 301, 302, 303 and 304; Group 2 including outlets 305 and 306 and Group 3 including outlets 307 and 308. In one embodiment of the present invention a group of outlets is controlled by a single switch. In that case a single control signal switches a controlling switch on or off, thus switching on or off all outlets in a group.

In one embodiment of the present invention a grouping is a physical grouping and all plugs in a group are controlled by a single address or a single relays or switch. In one embodiment of the present invention a grouping is established in software. Each plug therein has its own address and switch. However, at least two plugs with different addresses are placed in a single group. This means that the Building Management System instructs the Distributed Control Server to disconnect (if required due to a DR event) or to reconnect (if allowed by expiring of the DR event) all the devices in a group. In the Distributed Control Server, specific Software Agents are instructed to perform the connecting/disconnecting of devices in the room they control.

In one embodiment of the present invention the groups are formed in a software program, by combining the addresses of individually addressable outlets, allowing a plurality of individually controllable outlets to be considered and addressed as a switchable group. While FIG. 3 shows for instance outlets 301, 302, 303 and 304 as Group 1, a program may also include outlets 305 and 306 in Group 1. Accordingly, when a server instructs to shut down all devices in Group 1, in one embodiment of the present invention all outlets designated to be in Group 1, be it controlled by a single switch or individually controlled, are then switched off.

In one embodiment of the present invention each controllable power plug or outlet is provided with a group number or a priority number. Each room is also assigned a priority number. For instance certain outlets with critical equipment, which may not be in every room, has a highest priority, while low priority devices, such as a radio or a decorative lamp may have a low priority. Certain rooms, such as a server room, may have a high priority while a kitchen with a water heater may have a low priority.

Each device in a room is provided with a profile, stating its power consumption or with a power measurement instrument that provides actual power consumption to the server.

As part of a DR event response strategy, different combinations of groups of device priorities and room priorities are stored on the Building Management System (BMS). This may include exceptions based on room priority or individual exceptions. Based on a DR event level request received by the BMS, one or more sets of groups to be switched off are selected and passed to the Distributed Control Server wherein the relevant Software Agents instruct the devices in the affected groups to be switched off.

For instance a first level DR event requires a 5 kW shedding in a large building. This can be achieved by shedding all devices in a group of devices with low priority in all low priority rooms. In a higher level DR event, devices in a group with a higher priority are shed. It is noted that each group can have exceptions. That is, not all devices in a group have to be shed to achieve the required level of reduction. Exceptions may be granted to certain devices in a group, for instance in a high priority group, so that they are not switched off in a low level DR event.

Consumption of power is a dynamic event, machines are switched on when a task is started or are switched off or powered down when a task is completed. When a sufficient number of devices is switched on that can be switched off during a DR event, the starting up of a device, such as a printer or a copier, can be off-set by switching off devices in a lower priority group or room that have not been switched off. Assuming some latency in a large system, it could be counter-productive to allow a device to be started before a meter reading is taken by the utility. It is possible that the start-up of the new device, inadvertently, causes the measured power consumption to exceed the contractually allowed amount.

In one embodiment of the present invention a start-up or switching on of a device during a DR event is permission based. For instance, a request for start-up may be submitted to the Distributed Control Server, for instance through the tablet's HMI. The Software Agent may have access to information on "spare capacity" and may allow or reject use of the device and enable use by switching on the plug or reject by disconnecting the plug. In one embodiment of the present invention there is a forced delay of switching on new devices close to the moment of consumption measurement at least for a period that covers a maximum latency to respond to a switch-on request.

In certain cases virtually continuous power measurement is applied. In that case at no moment should the pre-set DR limit be exceeded. In one embodiment of the present invention each plug is enabled to report if a device on the plug is on (drawing a minimal amount of power) or is off. If a device is below a certain threshold of power consumption it is considered to be non-operational and the Software Agent may switch off all plugs that are non-operational during a DR event. A request is required, for instance from the tablet or a computer interface, to obtain permission through the Server, to activate the plug for the requested device. In response, the Server may require that a user switches a computer from AC to battery power before it for instance allows the use of a printer.

FIG. 4 illustrates part of an HMI interface 400 in accordance with an aspect of the present invention. It lists a DR event interface of a "Room kk" with a plurality of controllable power outlets. The left side shows a Group Preference of outlets organized in 3 groups, Group 1, Group 2 and Group 3. Other arrangements in different groups and more or fewer groups is also possible. The number of the group indicates a preference of shedding, based on a severity of a Demand Response event. The occupant of Room kk, prefers to first to shed devices in Group 1, being a lamp on outlet 301 and a radio on outlet 302 with a total power consumption of 125 Watt. In case more devices have to be shut off, devices in Group 2 should be considered, being a printer on 305 and a phone charger on 306 for a total of 200 Watt.

It is assumed that Room kk is in a building of ten floors, each with at least 10 rooms or offices. It should be required that in general each room places at least a device of 100 W in a Group 1. That means that when a shedding of up to 10 kW for the entire building is required, such shedding can be easily achieved by automatically disconnecting or shedding all Group 1 devices in the building.

Further shedding of loads can be achieved in a more severe Demand Response even by shedding all Group 2 devices in the building. The shedding of loads is determined and executed by the Agents from the server. The HMI interface provides suggestions to the server, but does not control the actual shedding of the devices.

Group 3 devices (as being in the last group, Group 3) preferably should be disconnected as a last resort. The user of Room kk puts a computer on outlet 307 and an extra monitor on outlet 308 in this group. Clearly, an occupant of Room kk, would prefer to continue to work on the computer, even if other devices have to be switched off. It is conceivable that if a computer is shut down, then the occupant can no longer perform the required duties and may as well leave the building. Accordingly, shedding of the computer should be preferably happen only if no other alternatives are available. One may notice that a second monitor on outlet 308 is also in Group 3. One may consider a second monitor a matter of convenience and not a pre-requisite to continue working on the computer.

To address that issue in one embodiment of the present invention an individual shedding preference list is provided and displayed on the right side of a screen (or on a separate interface) allowing a user to list in order of preference of shedding of devices. As indicated in FIG. 4, the computer on 307 is the last device to be disconnected. One building policy may be that only 1 outlet per room will be maintained powered as long as possible under the constraints of a Demand Response event. This provides an incentive for an occupant to list a computer as the most important device, rather than preserving a group of devices from shedding.

The HMI interface, the groupings and the preferences provide an indication to the server which devices to shed first. However, it is up to the server or based on preferences entered by the facility manager how the shedding is executed.

Figure 5:
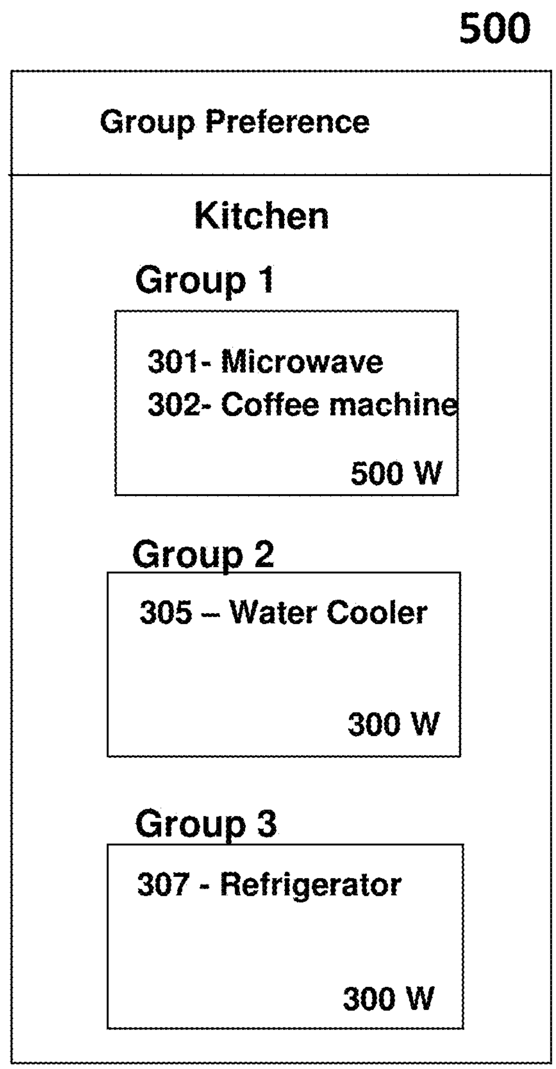

For instance, a facility manager may be able to shed general devices that do not directly affect workers before having to shed devices in an occupant's room or office. For instance, many office floors have a small kitchen or facility for lunch, with a coffee machine, a water cooler, a microwave, a refrigerator and perhaps one or more vending machines. An HMI 500 for an office kitchen is illustrated in FIG. 5. It shows different groups: Group 1 with on 301 a microwave and on 302 a coffee machine; Group 2 with on 305 a water cooler; and Group 3 with on 307 a refrigerator. Another high power consumption room is a copier room with copying and fax equipment. Another high power consumption room may be a server room with network servers that are enabled to run for a while on an un-interrupted power supply (UPS), allowing computers in the offices to switch from networked mode to local mode. For instance, some occupants may use switch-off delay provided by the UPC to switch to laptop or portable computers that can work on batteries for an extended period of time. Accordingly, many alternatives exist to respond to a Demand Response event.

Figure 6:
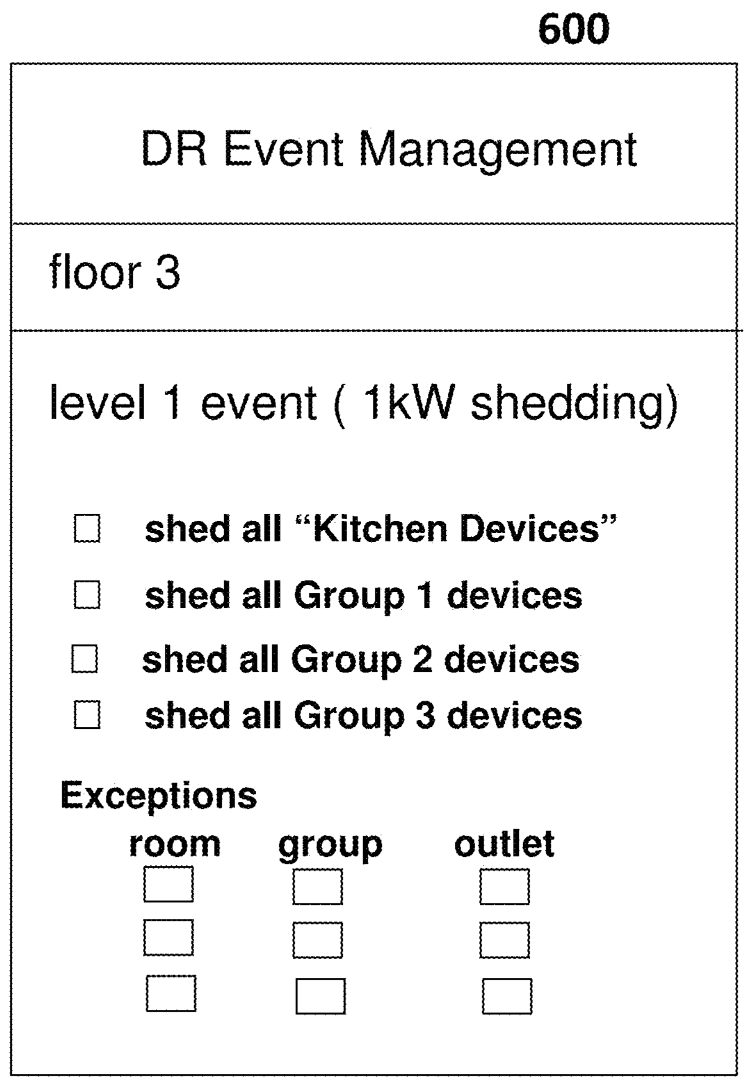
FIG. 6 illustrates another human-machine interface in accordance with various aspects of the present invention.

In accordance with an aspect of the present invention a person such as a facility manager who is authorized to determine the Demand Response event logic in response to a Demand Response event has access to an interface of a server to determine which devices are to be switched off and in which order in case of a declared Demand Response event. In FIG. 6 an interface 600 is available to an authorized person to set a shedding order in response to a level 1 Demand Response event to shed 1 kW per floor. (an overall 10 kW shedding event for 10 floors). The authorized person can set the devices for the whole building, per floor or per room or office if so desired. In interface 600, for example, the authorized person has a DR Event Management interface 600 for a specific floor (Floor 3). The authorized person can in this case shed all kitchen devices, or all Group 1 devices etc.

In accordance with an aspect of the present invention the authorized person can make exceptions for shedding, for instance per room, per group or per outlet. For instance, an occupant can make an arrangement to have certain outlets excluded from shedding in a case of a DR Event. For instance an occupant on a floor may volunteer certain computers to be disconnected from the power grid in case of a DR Event (as computers are high power consumers) to prevent one or more designated outlets from being shed.

An exception for switching off herein in accordance with one embodiment of the present invention is intended to mean an addressable outlet that is enabled to be switched off is deliberately omitted from a DR Event configuration file. An exception for switching off herein in a accordance with a further embodiment of the present invention is intended to mean an addressable outlet that is enabled to be switched off is deliberately omitted from a DR Event configuration file while comparable and/or equivalent outlets assigned to another user, another location or another organization within a facility or building is included in the DR Event configuration file. An exception for switching off herein in accordance with yet a further embodiment of the present invention is intended to mean an addressable outlet powering a device in a first location and/or is assigned to a first user and/or organization that is enabled to be switched off is deliberately omitted from a DR Event configuration file while at least two or addressable outlets that can be switched off and that empower similar devices and are assigned to another than the first user and/or organization within a facility or building are included in the DR Event configuration file.

This ability to configure the shedding process, based on a location, severity of the DR event, user preferences, and exceptions are all provided in accordance with one or more aspects of the present invention.

Once the building is configured for DR Events, the configurations files are uploaded to the server to provide the shedding logic to be executed in case of a DR Event.

Figure 7:
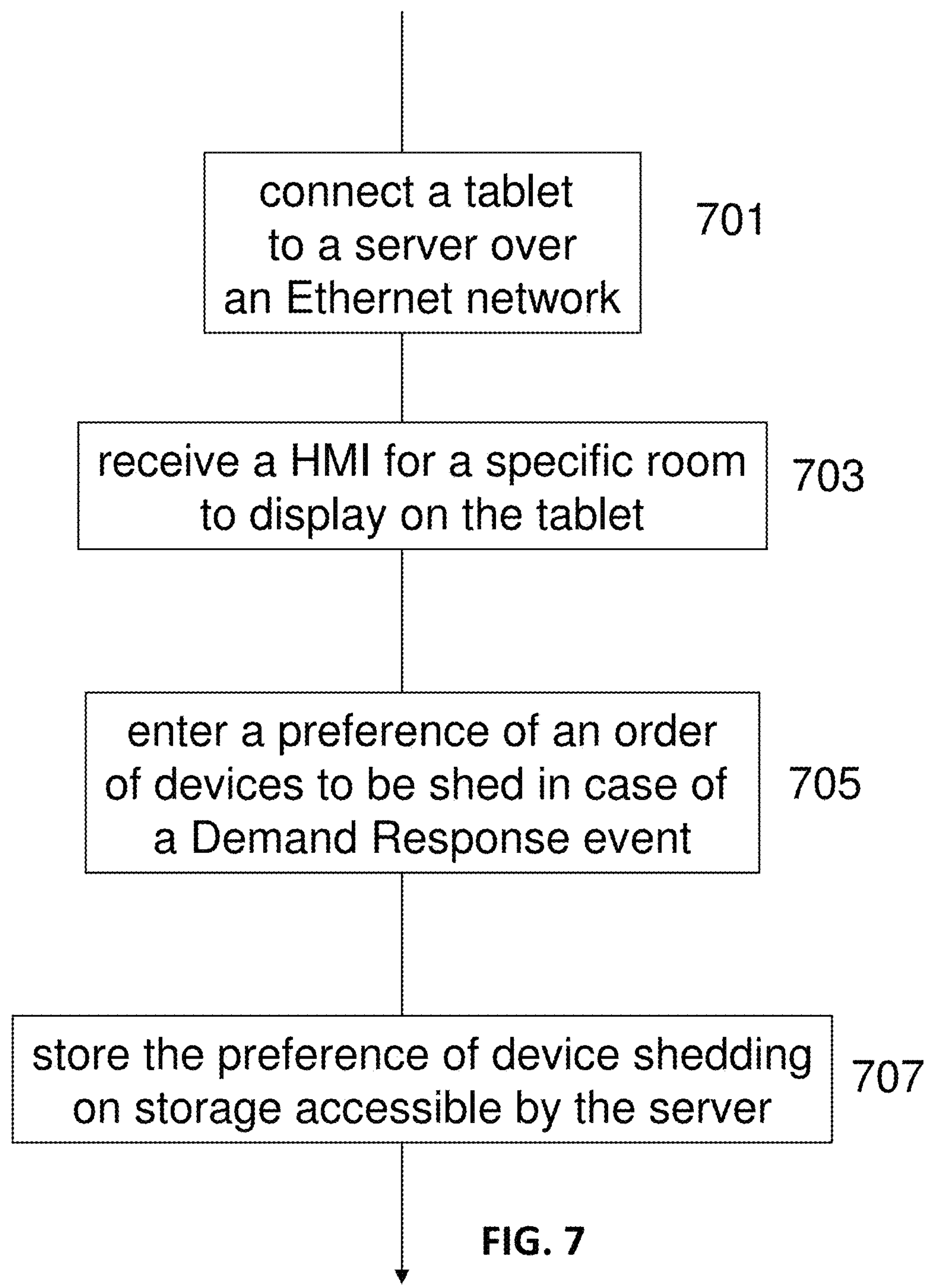
FIGS. 7, 8 and 9 illustrates steps performed by a processor in accordance with various aspects of the present invention.

FIG. 7 illustrates steps performed to enter user preferences for device shedding. In step 701 a tablet computer is connected to a server over a secure network, for instance an Ethernet network. The server in step 701 generates a Human-Machine Interface (HMI) for the tablet related to a specific location such as a room or an office. An office/room occupant in step 705 enters a preference of an order of shedding devices from the grid in case of a DR Event. In step 707, the preferences of device shedding related to a specific location are stored so they are accessible by a server. In accordance with an aspect of the present invention, preferences may be generated for different times of year. For instance for summer and for winter.

Figure 8:
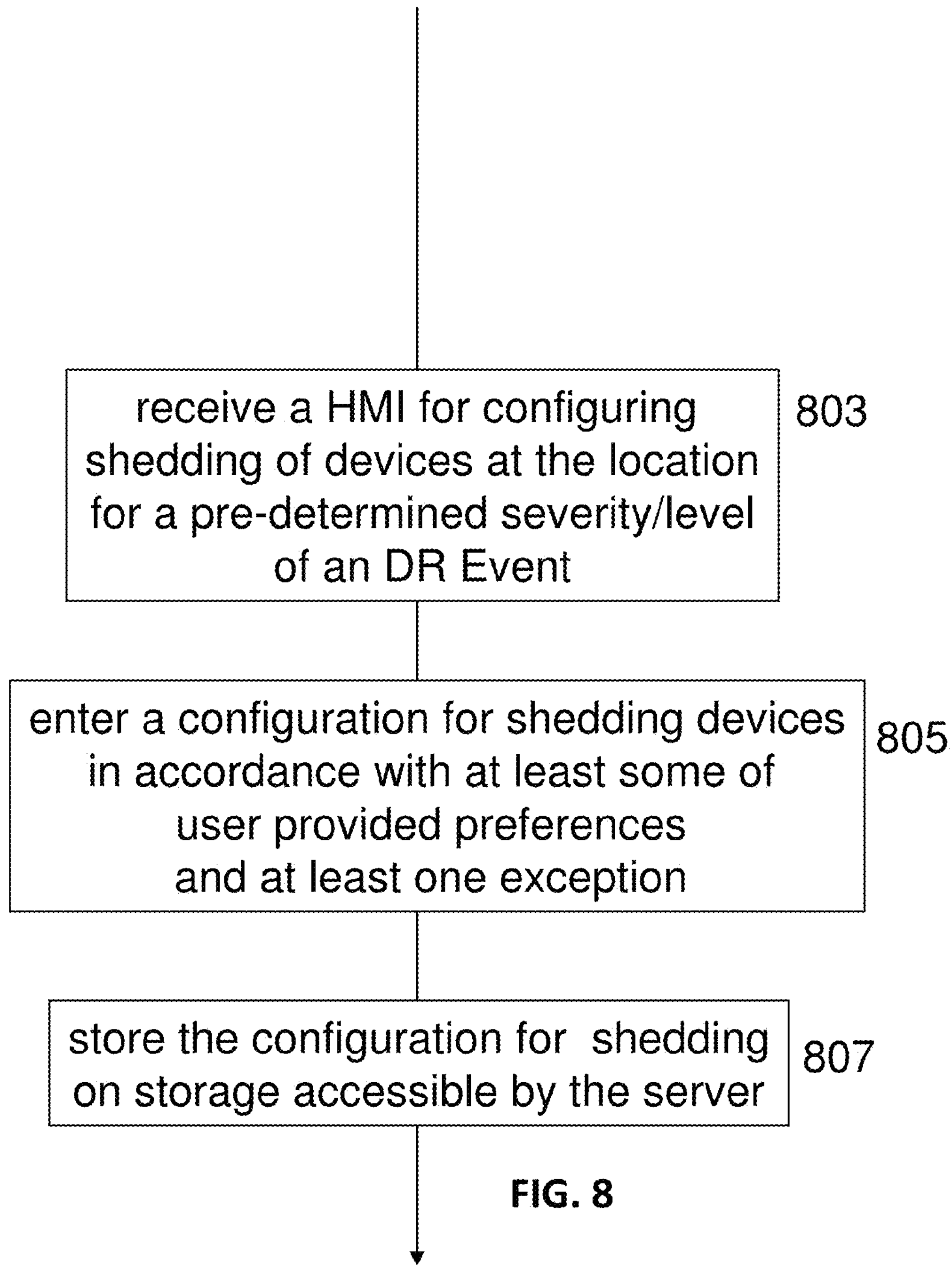

FIG. 8 illustrates steps performed to set up a configuration file for device shedding in case of a DR Event by an authorized user. The authorized user in step 803 receives and views an HMI for configuring a location (a specific room, an office, a floor, etc) for shedding devices at the location for a predetermined severity or level of a DR Event. For instance, a building may be requested to shed 10 kW, 25 kW, 50 kW or 100 kW in power. Large chunks may be shed for instance in central HVAC or lighting operations, while specific amounts may be saved by shedding predetermined devices at rooms, offices and floors. The authorized user applies in step 805 in one embodiment of the present invention at least some of the user preferences as generated and stored in FIG. 7 and in one other embodiment of the present invention applies at least one exception to the user preferred shedding order. A configuration file, only securely accessible by the authorized user and the server is stored in a storage device in step 807.

Figure 9:
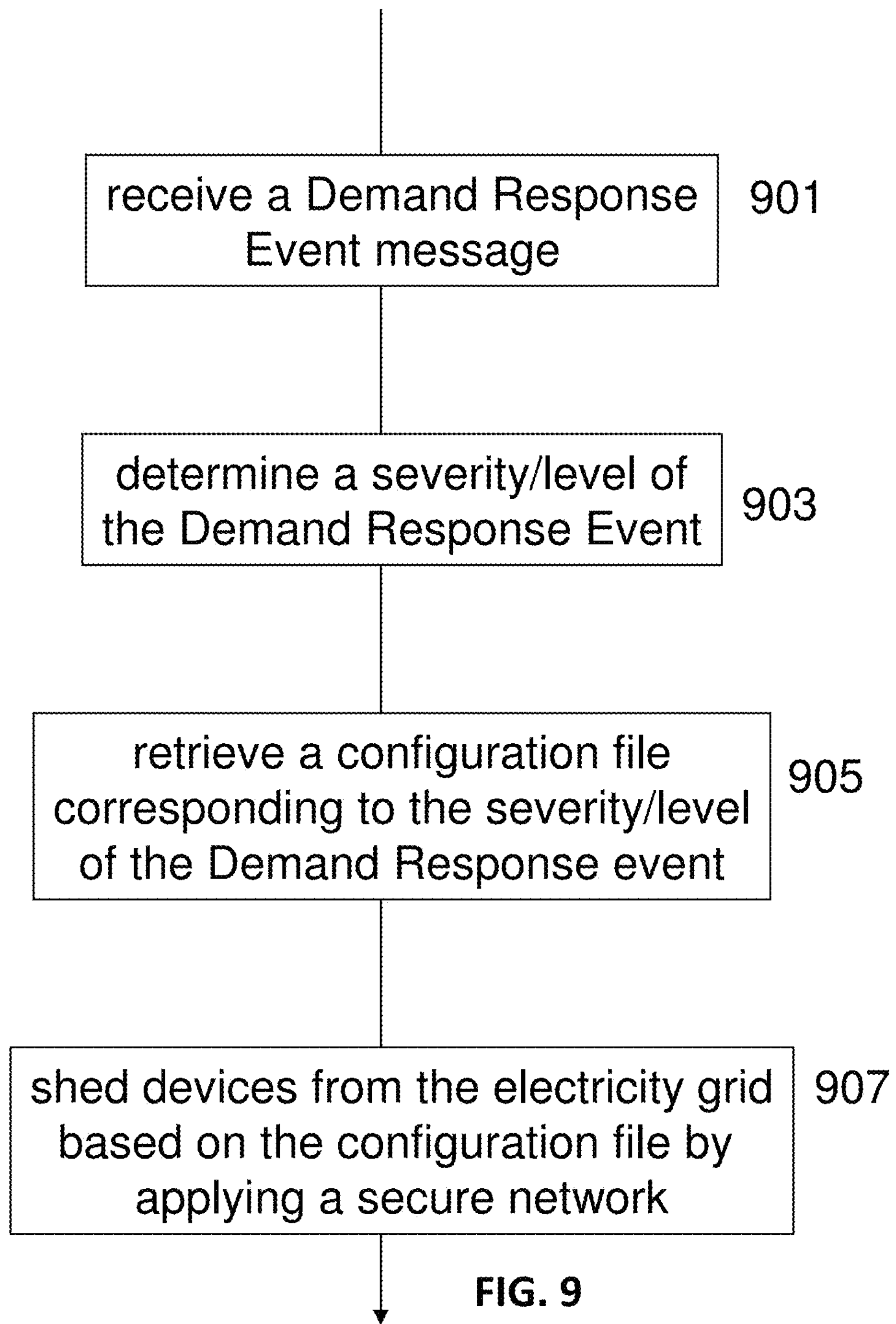

FIG. 9 illustrates steps of shedding during a Demand Response (DR) Event. In step 901 a server receives a Demand Response Event message with a specified amount of power to be saved for a period of time. The server in step 903 determines the saving requirements provided in the message and retrieves in 905 a configuration file corresponding to the severity level of the DR Event. The configuration file specifies the devices to be shed and the server in step 907 instructs the switches in the network identified by the configuration file to disconnect their corresponding devices from the power.

It is noted that the herein provided examples relate to absolute levels of power. Currently, certain Demand Response Programs are in effect that require customers to shed a percentage of their power usage. Often between 5% to 15% of their average or peak demand which often cannot be lower than 100 kW to participate. It should be clear that these percentage based programs also are enabled to use the methods and systems provided herein in accordance with various aspects of the present invention.

It is further noted that rooms or offices are used in the illustrative examples herein. This is convenient for illustrative purposes but is not really required. One can assume groups of distributive loads that are enabled to be selectively switched off. These groups can be determined per location, such as production locations, administrative locations, buildings or metered locations. For instance a location can be determined to have 100 loads, of which 15 can be switched off without affecting production for instance but only convenience. Another 15 may be switched off that will affect production and requires for instance re-assignment of personnel to machines. A factory may have several of those groups of distributed devices.

In the alternative one forms a list of all devices in a facility without regard for location and provides each device with an addressable switch and a rating of desirability to be switched off. For instance a rating 1 means effect is negligible, rating 2 is effect is inconvenience but does not affect production, etc. A rating 5 would be undesirable, and is equal to a power outage. One can then create a preferred list of devices to be switched off based on a severity of a Demand Response Event.

A building or a facility like an office campus may engage into a Demand Response agreement with a utility. The facility or building may host different organizations. For instance a building of 10 floors may host 10 different organizations, one on each floor. In accordance with an aspect of the present invention the offices of each organization are covered by at least one specific organization related electricity meter. Each organization which occupies an office or room, for instance as a result of a lease, and may be called an occupant may negotiate a specific Demand Response contract with the facility or the facility manager. Within the constraints of the Demand Response contract between the facility manager and the utility company, the facility manager is enabled to configure the Demand Response for the offices of each organization based on a negotiated agreement. For instance an organization on a first floor is willing to engage in an aggressive DR contract. It may provide employees with battery based computers such as laptop computers to enable continued productivity, while benefiting from low rates and incentives as a result of a DR event. An organization on a second floor may arrange to be shed from the grid only as a last resort and is willing to pay higher rates or even penalties to stay connected to the grid as long as possible under a DR event.

For instance devices connected to Group 3 may be contractually switched off in case of a high severity Demand Response Event. However, an organization may negotiate an exception for this switch-off. This exception may apply to only a limited number or even just one outlet. Such an exception will be entered into the related configuration files. A group such an exception group may have one or more addressable outlets.

Figure 10:
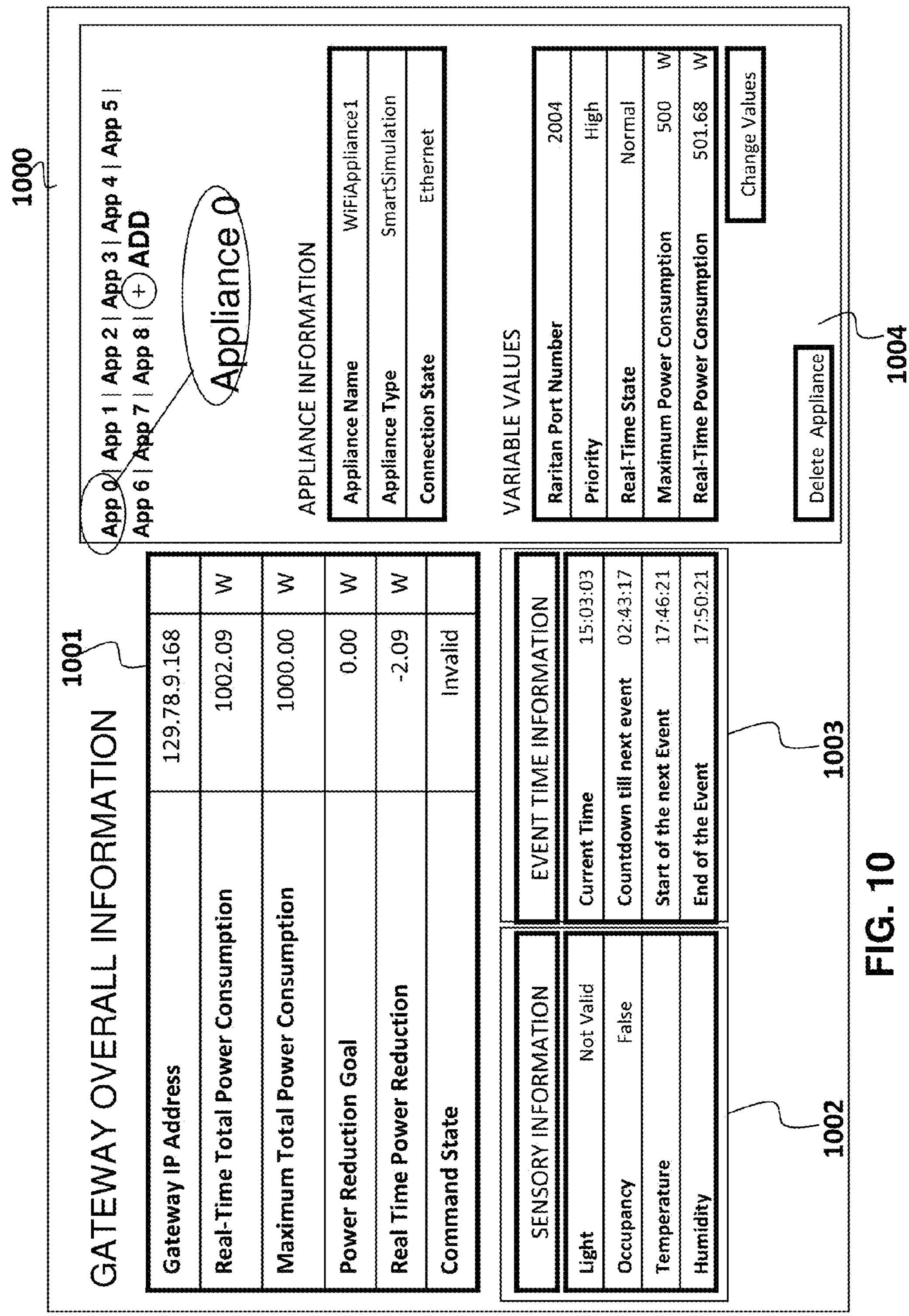

A HMI, also called a Web User Interface (web UI), on a tablet is provided in accordance with an aspect of the present invention. One Web UI 1000 is illustrated in FIG. 10. The Web UI or HMI for the computing devices such as tablets allows users to add, delete and edit the appliances for their room or location, while providing a dashboard for the status of the room or location and its appliances associated with a specific Web UI or HMI.

On the left of 1000 are the general information 1001, a sensor box feedback 1002, and Demand Response Event information 1003. A Power Reduction Goal and Demand Response Event are received from the server, and since the negotiation happens before the event time and the real control (turn on/off appliances) happens when the event starts, a countdown counter is provided in the Event Time Information section to inform the user about when the control will happen. The "Command State" is a string indicating the negotiation status.

The Sensor Information reflects the environmental factors if the sensors are installed in the room. If there are sensor installed, the control algorithm inside the agent will take the sensor information into account.

The right side of 1000 provides an appliance section 1004. All of the attached appliances can be clicked through to see their status. The appliances can also be edited, deleted or added by clicking the appropriate button.

When the "ADD" button is clicked, the "Create new Appliance" window as illustrated in FIG. 11 will pop out, and user can give the name, and the importance of the appliance. The user will also give "port number" for instance related to a smart power strip where this appliance is plugged into and which provides an address of the outlet on the power strip related to the appliance enabling it to be powered down or powered up. FIG. 12 illustrates a user interface to edit the appliance in accordance with an aspect of the present invention.

Figure 13:
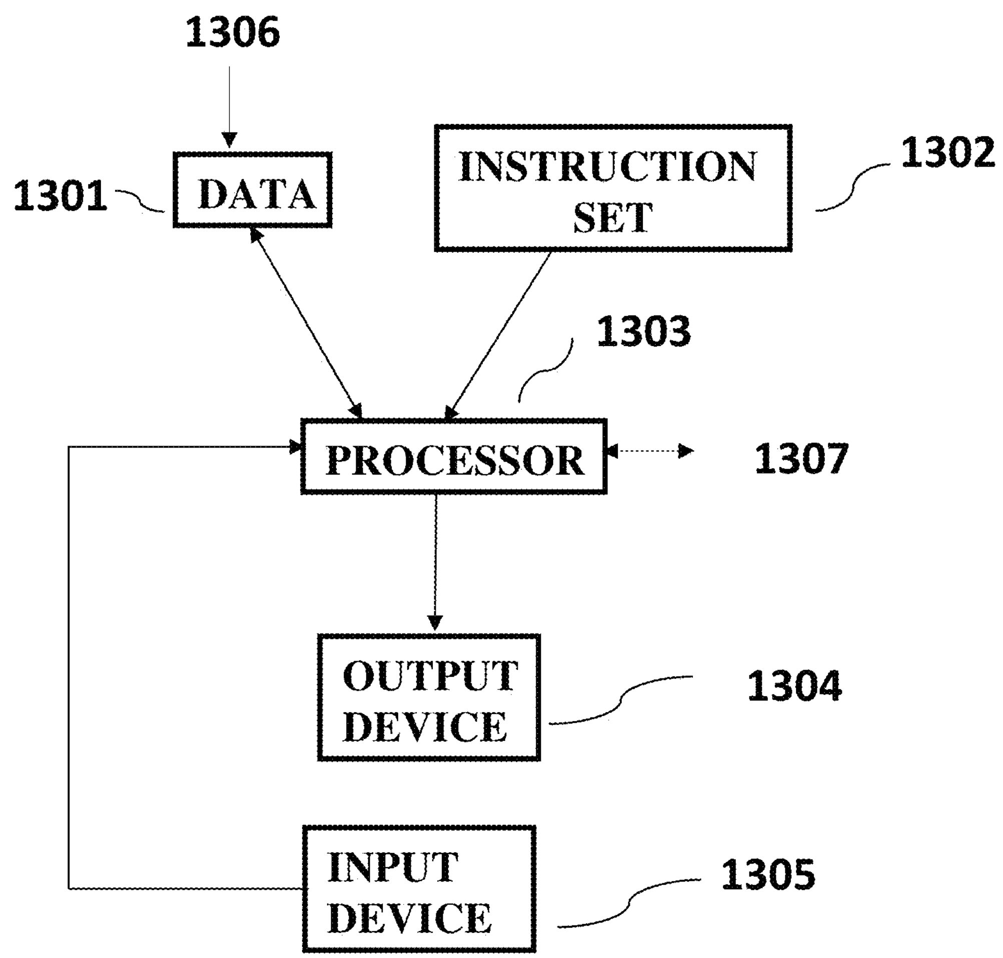
FIG. 13 illustrates a processor based system in accordance with various aspects of the present invention.

The methods as provided herein are, in one embodiment of the present invention, implemented on a system or a computer device. Thus, steps described herein are implemented on a processor in a system, as shown in FIG. 13. A system illustrated in FIG. 13 and as provided herein is enabled to receive, process and generate data. The system is provided with data that can be stored on a memory 1301. Data may be obtained from an input device. Data may be provided on an input 1306. Such data may be data provided by users via a user interface, by sensors in the building or from a data base or any other source that would contribute to determining a user preference profile or a device shedding configuration. The processor is also provided or programmed with an instruction set or program executing the methods of the present invention that is stored on a memory 1302 and is provided to the processor 1303, which executes the instructions of 1302 to process the data from 1301. Data provided by the processor can be signals designated for a network address of a port to connect or to disconnect a device to or from power at that port. Data provided by the processor can also be outputted on an output device 1304, which may be a display to display images or data or a data storage device. The processor also has a communication channel 1307 to receive external data from a communication device and to transmit data to an external device, for instance to a BAS device or a Smart Power Strip. The system in one embodiment of the present invention has an input device 1305, which may include a keyboard, a mouse, a pointing device, or any other device that can generate data to be provided to processor 1303.

The processor can be dedicated or application specific hardware or circuitry. However, the processor can also be a general CPU or any other computing device that can execute the instructions of 1302. Accordingly, the system as illustrated in FIG. 13 provides a system for processing data and is enabled to execute the steps of the methods as provided herein in accordance with one or more aspects of the present invention.

It is noted that especially large facilities, such as multi-floor office buildings, or campuses with many rooms have many different ways to achieve required savings during a DR Event. DR Events may be of a similar nature, especially during extended periods of extreme heat or extreme cold or during common peak demand periods during the day. Most of the operating conditions of these facilities are similar, from one day to the other or have commonalties with previous periods of similar conditions.

It has been disclosed in 'Zhang et al. "Distributed Intelligent Load Management and Control System" in Power and Energy Society General Meeting, 2012 IEEE 22-26 Jul. 2012, San Diego, Calif.', how the selection and shedding of individual loads can be optimized by a cost function wherein a load is modeled to reflect the dissatisfaction of the occupant for switching off or dimming the load, and an optimization method is deployed to minimize the participant's aggregated cost. In accordance with an aspect of the present invention one determines a priority of switching off a unit based on its cost function. One may further modify switching off order based on policies or other preferences. Optimization may require a considerable amount of time of the processor.

In one embodiment of the present invention the calculated and optimized shut-down configuration corresponding to a particular DR Event and measurable conditions is stored on a storage device and is associated with achieved power savings. When a next DR Event takes place under similar conditions a processor or a server may retrieve the stored configuration and activate the shut down logic corresponding to the retrieved configuration. In a next step the processor can check based on the metered power consumption if the required savings are achieved. Additional switches can be switched off based on the priority list if the savings are not achieved.

The above approach can be applied advantageously when an unexpected DR Event takes place or a severity of a DR Event is changed and requires a quick response which does not allow for an extensive optimization run.

A separated architecture of Plug-in load Control logic in Software Agents on a first Server and HMI on computing devices that have only access to a related Software Agent provides security to building management system, because there is no direct connection from HMI device to the building management system on a second server and an end user can only access the interfaces provided by Software Agents on HMI.

Centralized placement of Software Agents on a single server, where each Agent controls distributed plug loads in one room, enables the system administrator with full control on plug load control strategies because any change to the strategy can be implemented on the same physical machine to all Agents without notifying end users. In addition, comparing to having control strategies on the same device as HMI, the proposed system architecture also provides higher protection on the plug load control strategies with centralized management, because the end users can only change configurations from HMI, and are not possible to access any further control logic on the server.

Tablets are provided as HMI for distributed controllers and are enabled to be customized with Ethernet connection if so needed based on security requirements.

The following references provide background information generally related to the present invention: [1] Assessment of Demand Response and Advanced Metering, FERC report, September, 2007; [2] A National Assessment of Demand Response Potential, FERC report, prepared by The Brattle Group, Freeman, Sullivan & Co and Global Energy Partners, LLC, June, 2009; [3] S. Lu et al., Centralized and decentralized control for demand response Innovative Smart Grid Technologies (ISGT), 2011 IEEE PES, January 2011; [4] J., Wang, M. Biviji, And W. M. Wang, Case studies of smart grid demand response programs in North America, Innovative Smart Grid Technologies (ISGT), 2011 IEEE PES, 2011, pp.: 1-5; [5] National Institute of Standards and Technology, NIST Framework and Roadmap for Smart Grid Interoperability Standards, Release 1.0, Special Publ. 1108, January 2010, pp. 145-146; [6] http://www.coned.com/documents/elec/158q-158r8.pdf; [7] X. Chen, J. Jang, and D. Auslander and et al., Demand Response-Enabled Residential Thermostat Controls, 2008 ACEEE Summer Study on Energy Efficiency in Buildings, 2008; [8] S. Kiliccote, M. A. Piette and D. S. Watson, Dynamic Controls for Energy Efficiency and Demand Response: Framework Concepts and a New Construction Study Case in New York, Proceedings of the 2006 ACEEE Summer Study on Energy Efficiency in Buildings, Pacific Grove, Calif., August, 2006; [9] W. Zhang, S. Zhou and Y. Lu, Distributed Intelligent Load Management and Control System, 2012 IEEE Power & Energy Society General Meeting, San Diego, Calif., July, 2012; and [10] NYDailyNews.com http://www.nydailynews.com/news/money/tablets-popularity-roof-onethird-u-s-intemet-users-survey-article-1.1097990; [10] U.S. Patent Application Publication Ser. No. 20130090777 to Lu, Yan et al. published on Apr. 11, 2013 entitled "ADAPTIVE DEMAND RESPONSE BASED ON DISTRIBUTED LOAD CONTROL".

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A system to manage a group of devices in each room in a plurality of rooms in a facility connected to an electricity grid under a Demand Response (DR) Event, comprising:

a first server connected by a network to the plurality of rooms, each of the plurality of rooms having a plurality of switches, each switch enabled to selectively switch on or off a device in the group of devices from the electricity grid, the first server hosting a plurality of software agents, wherein:

each software agent is enabled to selectively control on/off switching of the plurality of switches in one of the plurality of rooms in accordance with an order of switching off of the plurality of switches in the one of the plurality of rooms based on a level of severity of the DR Event, wherein the plurality of switches includes a first group of switches corresponding to a first subgroup of the group of devices and a second group of switches corresponding to a second subgroup of the group of devices, wherein the order of switching off of the plurality of switches indicates that the first group of switches is to be switched off and the second group of switches is to remain on based on the level of severity of the DR event, and wherein the first subgroup of the group of devices includes at least one device having a power consumption of at least a threshold value;

a computing device connected via the network to the first server to cover the one of the plurality of rooms and enabled to display a Human-Machine Interface (HMI) exclusive to the one of the plurality of rooms, the HMI being generated by a first software agent in the plurality of software agents which is dedicated to the one of the plurality of rooms and the HMI being enabled to provide the order of switching off of the plurality of switches in the one of the plurality of rooms during the DR event; and a second server connected to the first server by a secure network enabled to determine the level of severity of the DR Event and to instruct the first software agent to switch off at least one switch in accordance with the order of switching off of the plurality of switches.

2. The system of claim 1, wherein the order of switching off the plurality of switches is a preferred order.

3. The system of claim 1, wherein the order of switching off of the plurality of switches is enabled to be modified through a device that is authorized to be used by a facility manager.

4. The system of claim 1, wherein the second server is enabled to access a configuration file to provide instructions to the first software agent for the order of switching off of the plurality of switches.

5. The system of claim 4, wherein the configuration file is enabled to be modified through a computing device on the secure network.

6. The system of claim 1, wherein the HMI is not enabled to access the second server.

7. The system of claim 1, wherein the computing device is a tablet.

8. The system of claim 7, wherein the tablet is connected to the network through a wired connection.

9. The system of claim 1, wherein a switch in the single room that connects to a non-operational device is switched off during the DR Event.

10. The system of claim 9, further comprising:

the HMI transmitting a request to the first server to switch on the switch in the single room to allow the non-operational device to become operational.

11. The system of claim 1, wherein the order of switching off of the plurality of switches is determined by a Demand Response contract with an occupant of the single room.

12. A method for managing a group of devices in each room in a plurality of rooms in a facility connected to an electricity grid under a Demand Response (DR) Event, comprising:

connecting the plurality of rooms by a network to a first server, each of the plurality of rooms having a plurality of switches, each switch enabled to selectively switch on or off a device in the group of devices from the electricity grid, the first server hosting a plurality of software agents, wherein:

each software agent is enabled to selectively control on/off switching of a plurality of switches in one of the plurality of rooms in accordance with an order of switching off of the plurality of switches in the one of the plurality of rooms based on a level of severity of the DR Event, wherein the plurality of switches includes a first group of switches corresponding to a first subgroup of the group of devices and a second group of switches corresponding to a second subgroup of the group of devices, wherein the order of switching off of the plurality of switches indicates that the first group of switches is to be switched off and the second group of switches is to remain on based on the level of severity of the DR event, and wherein the first subgroup of the group of devices includes at least one device having a power consumption of at least a threshold value;

connecting a computer covering the one of the plurality of rooms via the network to the first server, the computer being enabled to display a Human-Machine Interface (HMI) exclusive to the one of the plurality of rooms, the HMI being generated by a first software agent in the plurality of software agents, the first software agent being dedicated to the one of the plurality of rooms and the HMI being enabled to provide the order of switching off of the plurality of switches in the one of the plurality of rooms during the DR event; and connecting a second server to the first server by a secure network enabled, the second server enabled to determine the level of severity of the DR Event and to instruct the first software agent to switch off at least one switch in accordance with the order of switching off of the plurality of switches.

13. The method of claim 12, wherein the order of switching off of the plurality of switches is a preferred order.

14. The method of claim 12, wherein the order of switching off of the plurality of switches is enabled to be modified through a device that is authorized to be used by a facility manager.

15. The method of claim 12, wherein the second server is enabled to access a configuration file to provide instructions to the first software agent for the order of switching off of the plurality of switches.

16. The method of claim 15, wherein the configuration file is enabled to be modified through a computing device connected to the secure network.

17. The method of claim 12, wherein the HMI is not enabled to access the second server.

18. The method of claim 12, wherein the HMI computer is a tablet.

19. The method of claim 18, wherein the tablet is connected to the network through a wired connection.

20. The method of claim 12, wherein a switch in the one of the plurality of rooms that connects to a non-operational device is switched off during the DR Event.

* * * * *